United States Patent [19]

Futamura et al.

[11] 3,953,543
[45] Apr. 27, 1976

[54] POLYMERIZATION PROCESS AND POLYMER PRODUCED THEREBY

[75] Inventors: Shingo Futamura, Seville; Thomas Chester Bouton, Akron, both of Ohio

[73] Assignee: The Firestone Tire & Rubber Company, Akron, Ohio

[22] Filed: Dec. 26, 1973

[21] Appl. No.: 428,269

[52] U.S. Cl. ............................. 260/880 B; 526/65; 526/79; 526/87; 526/88; 526/173; 526/340
[51] Int. Cl.² .................................... C08G 297/04
[58] Field of Search .................. 260/880 B, 83.7

[56] References Cited
UNITED STATES PATENTS

| | | | |
|---|---|---|---|
| 3,440,304 | 4/1969 | Hall | 260/880 |
| 3,449,306 | 6/1969 | Zelinski | 260/83.7 |
| 3,778,490 | 12/1973 | Hsieh | 260/880 B |

Primary Examiner—Christopher A. Henderson

[57] ABSTRACT

The process disclosed herein involves the preparation of butadiene-styrene copolymers of improved green strength and low running temperature when used in tire compositions, which comprises the steps of polymerizing a mixture of butadiene and styrene in a hydrocarbon solvent having a lithium alkyl initiator therein while the monomer mixture is fed into the polymerization system at a rate slow enough to effect random copolymerization in the resulting polymer backbone, effecting a high degree of branching by conducting the polymerization at a temperature of 90°–175° C. (190°–347° F.) and effecting the final 10–50 percent of the polymerization with a monomer portion containing a higher proportion of styrene than is incorporated into the polymer-backbone, thereby effecting the formation of block polystyrene at the terminals of a plurality of branches. This copolymer of improved green strength and low running temperature is very useful in tire compositions.

21 Claims, 4 Drawing Figures

PERCENT CONVERSION OF TOTAL MONOMER
BATCH OPERATION USING 60/40 BD/STYRENE

PERCENT CONVERSION OF TOTAL MONOMER
BLEND OF 60/40 BD/STYRENE ALL METERED IN BUT 5% MORE STYRENE ADDED WHEN BLEND IS ALL METERED IN

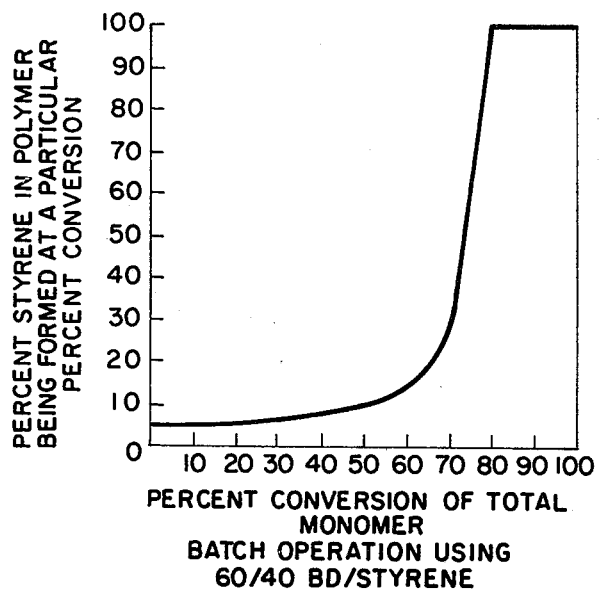
Fig. 1 — BATCH OPERATION USING 60/40 BD/STYRENE
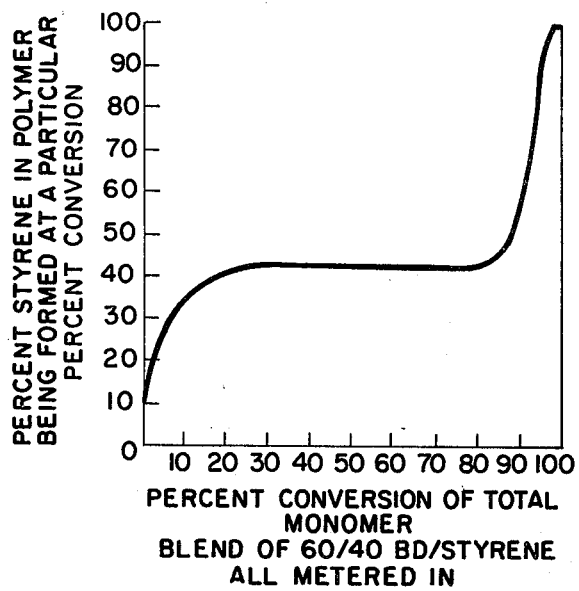
Fig. 2 — BLEND OF 60/40 BD/STYRENE ALL METERED IN
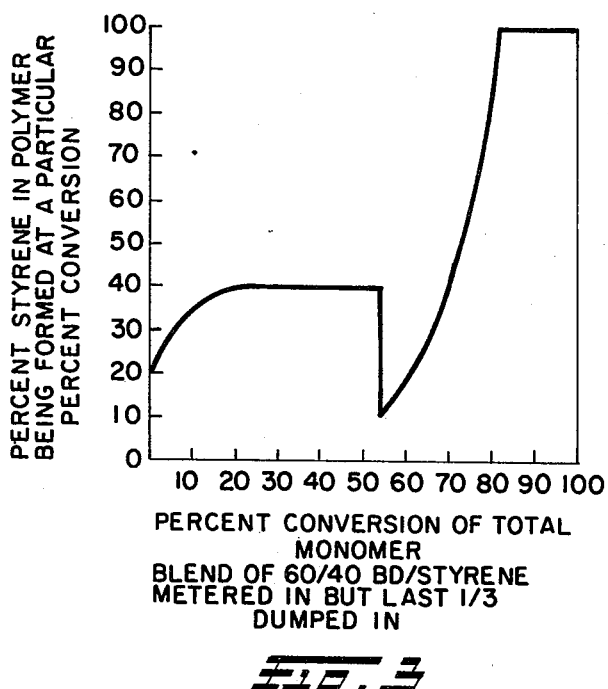
Fig. 3 — BLEND OF 60/40 BD/STYRENE METERED IN BUT LAST 1/3 DUMPED IN
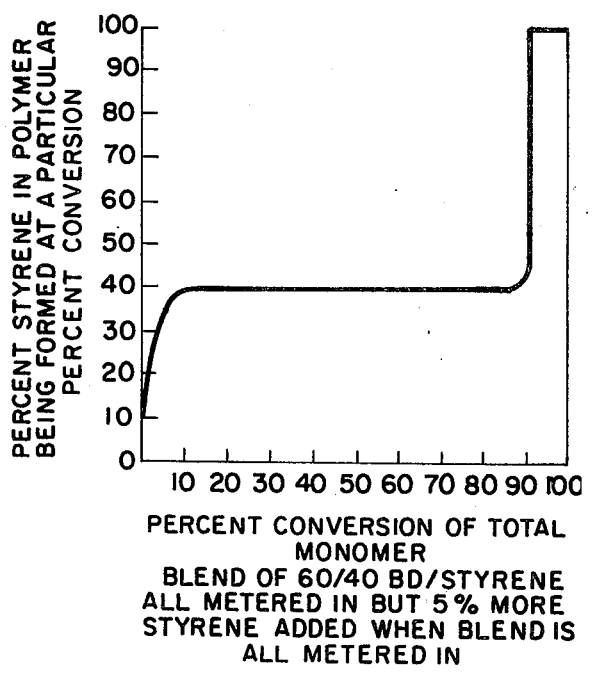
Fig. 4 — BLEND OF 60/40 BD/STYRENE ALL METERED IN BUT 5% MORE STYRENE ADDED WHEN BLEND IS ALL METERED IN

POLYMERIZATION PROCESS AND POLYMER PRODUCED THEREBY

BACKGROUND OF THE INVENTION

1. FIELD OF THE INVENTION

This invention relates to copolymers prepared from a monomer mixture of styrene and butadiene-1,3, hereinafter referred to as "butadiene." More specifically this invention relates to copolymers of styrene and butadiene which contain block polystyrene. Still more specifically it relates to a highly branched copolymer of styrene and butadiene having block polystyrene at the terminals of a plurality of branches.

2. RELATED PRIOR ART

Block copolymers of styrene and butadiene are known. Some of these, referred to as "S-B-S" polymers, have a central core of block polybutadiene and two terminals of block polystyrene. Other block polymers having the designation "B-S" have one block of polystyrene and one block of polybutadiene. Such copolymers which contain significant amounts of block polystyrene have not been acceptable for pneumatic tire applications. The presence of as little as 5–10 percent block polystyrene has caused excessive heat build-up in tires made from such copolymers. Hence the S-B-S and B-S types of block copolymer have not been used in tires. Among the polymers which have been used successfully in pneumatic tires are natural rubber, styrene-butadiene emulsion copolymers (SBR), and various stereospecific isoprene and butadiene homopolymers and copolymers with styrene. However, except for natural rubber and isoprene homopolymers, these polymers possess a low uncured or "green" tensile strength. For the manufacture of tires, it is desirable that a styrene-butadiene copolymer should combine the two desirable properties high green strength and low heat build-up or running temperature.

U.S. Pat. No. 3,440,304 discloses the batch polymerization of a mixture of butadiene and styrene and teaches that although the initial proportions in the monomer mixture are 75 parts of butadiene and 25 parts of styrene, the copolymer formed initially contains less than 10 percent, generally about 5–7 percent by weight of styrene, and after all the butadiene monomer is consumed, the residue of styrene monomer results in a terminal block of polystyrene being formed.

U.S. Pat. No. 3,094,542 shows the preparation of random copolymers of butadiene and styrene with all the styrene copolymerized without formation of block polystyrene. This is effected by adding a mixture of butadiene and styrene to the polymerization reactor at a rate slower than the normal polymerization rate. In this way, all or substantially all of the styrene is consumed in random copolymerization and there is less than 2 percent and generally no block polystyrene formed. The patentee also demonstrates that batch polymerization or very rapid addition of the monomer mix produces about 15–20 percent of block polystyrene.

British Pat. No. 1,136,189 discloses a continuous process for copolymerizing butadiene and styrene in a reactor in which vigorous agitation gives a homogeneous reaction mass to produce a random copolymer, with the reaction solution as it is withdrawn from the reactor containing less than 3 percent styrene. In order to avoid separation and recovery of styrene, this solution is further processed to polymerize the remainder of the styrene, thereby giving a single, small polystyrene block at the end of the polymer molecule. When the residual monomer is less than 3 percent, this is considered by the patentee as not objectionable in converting the residual styrene to a terminal block.

None of these prior art polymers have the desired combination of high green strength and low running temperature when used in tire compositions.

STATEMENT OF THE INVENTION

By very careful control of the amount and the distribution of styrene repeating units in the styrene-butadiene copolymer it has now been found possible by the process of this invention to produce butadiene-styrene block copolymers having very good green strength and low running temperatures. This is effected by having styrene repeating units randomly distributed in the core or polymer backbone, having a high degree of branching in the polymer backbone and having block polystyrene attached at the terminals of the plurality of branches. High branching in the copolymers is effected by polymerizing at 90–175° C., preferably 100–150° C. The polymers of this invention contain 15–60 percent, preferably 30–50 percent by weight of styrene repeating units, with the remainder being butadiene repeating units, with 10–40 percent by weight of the styrene repeating units being in the form of a plurality of terminal polystyrene blocks, and that at least 10 percent of the total polymer weight is random styrene and at least 5 percent, preferably at least 7 percent of the total polymer is terminal block polystyrene. The butadiene portion of the copolymers advantageously has 5–30, preferably 5–15 percent by weight in the 1,2 structure, 5–40, preferably 20–40 percent cis-1,4 and 25–70 percent in the trans-1,4 structure. These copolymers have weight average molecular weights ranging from 20,000 to 750,000 as determined by intrinsic viscosity.

The improved green strength of the copolymers of this invention is evidenced by the greater energy required for break of a test specimen. Moreover, when compounded and vulcanized in a tire composition, such as described in Example VI, these copolymers have a running temperature below 145° C. (295° F.), and generally below 120° C. (250° F.).

These copolymers, either by themselves or in blends with other polymers, are very useful in the construction of tires or other elastomeric products such as belts, hose or molded goods. Other polymers suitable for blending with these copolymers include natural rubber, isoprene or butadiene homopolymers, isoprene-styrene copolymers and butadiene-styrene copolymers.

In preparing the copolymers of this invention, the rate of monomer addition to the polymerization system effects and controls the random copolymerization of styrene in the polymer backbone, which is believed to be responsible for the good running temperature properties. In combination with this, the high temperature, 90°–175° C., preferably 100–150° C., used in the polymerization effects a high degree of of branching which improves processability, and gives a plurality of terminals in the various branches for the attachment of block polystyrene, which is believed to effect the improvement in green strength.

In preparing the copolymers, a mixture of styrene and butadiene, together with an inert hydrocarbon diluent, such as hexane, cyclohexane or toluene or mixtures thereof, is charged into an agitated reactor containing a lithium-based initiator. The charging is performed at such a rate that the polymerization system is sufficiently deficient in butadiene as to induce the copolymerization of styrene and butadiene and thereby produce random distribution in the polymer backbone. Also, as mentioned before, the temperature of polymerization is maintained sufficiently high to produce a high degree of branching, as is evidenced by the Williams Plasticity values obtained on such copolymers. The final 50 to 20 percent of the polymerization is effected with an increase in concentration of styrene in the monomer portion. By having a high degree of branching in the polymer backbone, there are a greater number of terminals to which block polystyrene can be attached and thereby effect improvement in green strength.

In the initial 50 percent or more of the polymer formation, the monomer mixture is fed in at such a rate that as the butadiene is continuously consumed at least some of the styrene is being copolymerized in a random repeating unit arrangement. This polymerization rate is affected by a number of factors, including the temperature, the solvent or diluent, the ratio of styrene to butadiene, the specific type of catalyst used, and the concentration of catalyst. It is also very important to have very efficient agitation to provide homogeneity and intimate contact of the various components.

The polymerization rate is easily measured once these various factors have been determined. For example, a solution of styrene and butadiene in the desired proportions is made in a selected diluent and catalyst is added. The mixture is agitated while aliquot portions are removed and inserted in polymerization bottles and individually sealed. A number of these polymerization bottles are placed in a polymerization bath and maintained at identical conditions for varying periods of time. By removing an individual bottle at the appropriate time, and after stopping the polymerization therein by cooling and adding a stopping agent such as alcohol, the solvent is vaporized and the amount of polymer determined. In this way the amount of polymer produced over various periods of time is easily determined and the rate of polymerization for this particular set of conditions can be calculated. A curve can be plotted to represent this rate of polymerization.

When the monomer feed rate is maintained in the range of 0.05 to 0.75 times the polymerization rate, the random type of styrene copolymerization is effected initially and also an excess of styrene may be accumulated so that in the latter stages of the polymerization after the monomer feed is terminated, the butadiene is completely consumed and block polystyrene is thereafter formed at the various terminals of the branches. The polymerization rate is a unit of the reciprocal of time. The reciprocal of the feed rate represents the metering time.

Instead of accumulating styrene by maintaining the feed rate within the range indicated, it is also possible to have the feed rate below this range, in which case more styrene is consumed in the random copolymerization, and a high concentration of styrene at the final period of polymerization is effected by dumping into the polymerization system the final 50–20 percent of the monomer feed, or it is also possible to continue the feed at the same rate and within or after the final 10 percent of polymerization an amount of styrene is added all at once to the polymerization system. In either case the styrene is thereby made available to form the block polystyrene at the terminals of the branches.

A preferred method of determining an appropriate feed rate for the purpose of this invention is to perform a series of polymerizations using identical conditions and proportions, but varying the rate of feed from fast feed to slow feed. In each of this series of reactions appropriate amounts of solvent and catalyst are placed in the reactor and maintained at the desired reaction temperature while comonomer-solvent blend is introduced at the desired rate. When the feeding is completed, the catalyst is deactivated by adding isopropanol or other catalyst deactivator and the percent conversion determined. This can be done by evaporating the solvent and monomer from a weighed portion of the polymer solution and, after determining the amount of polymer residue, calculating the percent conversion of monomer to polymer. The range of feed rate that gives between 60 percent and 90 percent conversion upon completion of the feeding of the total amount of blend is appropriate for the purpose of this invention. Since the butadiene polymerizes more rapidly than the styrene, this range of feeding rates results in both the production of a desired amount of random copolymerization and an accumulation of styrene monomer in the unpolymerized portion of the reaction mass, generally about 5–40 percent of the total monomers, and if this is subsequently polymerized it produces terminal blocks of polystyrene.

However, as previously indicated, a feed rate even slower than that described above can be used provided the remaining portion of the feed is dumped into the reactor after 50–90 percent, preferably 60–85 percent, of the feed has been introduced, or an additional amount (5–40% based on total monomers) of styrene is added after or shortly before the feeding of blend is completed.

The initiator used in the polymerization is a hydrocarbon-lithium initiator. This includes compounds corresponding to the formula RLi, where R is an aliphatic, cycloaliphatic or aromatic hydrocarbon radical containing from 1 to 20 carbon atoms. Among the many compounds suitable for this purpose are methyllithium, ethyllithium, isopropyllithium, n-butyllithium, sec.-butyllithium, t-butyllithium, amyllithium, hexyllithium, p-octyllithium, n-decyllithium, cyclohexyllithium, allyllithium, methallyllithium, phenyllithium, naphthyllithium, p-tolyllithium, p-butylphenyllithium and 4-phenylbutyllithium. Mixtures of two or more of the above may be employed. Particularly preferred is n-butyllithium.

A small amount of the initiator is used to scavenge or neutralize impurities present in the solvent or monomer. Therefore, the amount of initiator used is that required for scavenging purpose plus the amount required to produce the desired molecular weight in the resultant polymer. Theoretically, each molecule of initiator, over and above that used for scavenging, produces a molecule of polymer, so the initiator level should be the reciprocal of the desired molecular weight in moles of initiator per mole of reactive monomer. In general, however, from 0.001 to 1 millimole of initiator is required per mole of monomer to be polymerized, preferably from 0.005 to 0.5 millimole of initiator per mole of monomer.

In the polymerization system, it is especially important to exclude materials harmful to the initiator. These materials include water, oxygen, carbon dioxide and other similar materials which "kill" or deactivate the initiator. Preferably the incoming monomers and diluent are treated to remove such impurities prior to introduction to the polymerization system.

The diluent is advantageously an aliphatic hydrocarbon of 4–10 carbon atoms or an aromatic hydrocarbon of 6–10 carbon atoms which is inert to the initiator employed. The diluent can be one in which the polymer is soluble or partly soluble, or in which the polymer may be suspended. Pentanes, hexanes, heptanes, cyclohexane, cyclohexene, pentenes, hexenes, heptenes, benzene and toluene are preferred as diluents, especially hexanes and cyclohexanes. Mixtures of these may also be used.

From 200 to 900 parts by weight of diluent per 100 parts of monomer is generally sufficient to yield a fluid polymer solution or suspension which can be easily handled.

The temperature of the polymerization of the polymerization mass should be maintained between 90° and 175° C., preferably 100–150° C. in order to produce the desired degree of branching, and preferably is maintained at a relatively constant temperature throughout the course of the reaction period. Polymerization is advantageously performed in an agitated, pressurized reactor which may be jacketed to allow for temperature control. Pressures are generally autogenous, although inert gases can be charged to the reactor to increase the pressure, if desired. Dry nitrogen, argon, helium or other inert gas can be used for this purpose. Normally pressures will be atmospheric or above, and can be as high as 10 atmospheres or more.

In some embodiments discussed herein, the polymer of the invention is produced in a batch reaction, with the monomer being charged continuously over a calculated period of time. Continuous polymerization techniques may also be employed, with the monomers continuously introduced into one or more reactors and polymer continuously removed. For example, two or more reaction zones or individual reactors in series can be used for continuous polymerization, with monomers being charged to the first reaction zone or first reactor under very efficient agitation. In the last reaction zone or last reactor, where the final ten percent of polymerization is effected, there may be very little agitation and polymer is removed from this last reaction zone or reactor. In such cases, it is desired that the agitation in the first zone or first reactor be sufficient to produce homogeneity almost instantly upon introduction of the monomer feed into the polymerization system.

Batch reactions are generally performed in from 0.1 to 5 hours, preferably 0.5 to 5 hours, with the reaction proceeding essentially to completion. With continuous polymerization techniques, the residence time will range from 0.25 to 3 hours, preferably at least 0.5 hour.

In the drawings,

FIG. 1 illustrates a typical copolymer contour obtained when batch polymerization is effected to 100 percent conversion on a mixture of 60 weight percent butadiene and 40 weight percent styrene with the blend all in the reactor at the beginning of the polymerization. The various points on the curve represent the percentage of styrene entering the polymer at a particular percent of conversion of total monomer. The procedure used in preparing the copolymer is similar to that described hereinafter in Example I.

FIG. 2 represents a typical copolymer contour when a blend of 60/40 butadiene/styrene is metered in and the polymerization continued to 100 percent conversion. This procedure is somewhat similar to that used in Example IIIA.

FIG. 3 represents the copolymer contour obtained when the polymerization is operated as for FIG. 2 except that the final one-third of the monomer feed is dumped into the reactor when two-thirds of the monomer feed has been metered into the system. This represents a copolymerization using a procedure similar to Examples II and IIIB.

FIG. 4 represents the corresponding copolymer contour when a copolymerization is operated as for FIG. 2 except that an additional 5 percent of styrene is added at the end of the metering of the monomer feed. This procedure is similar to that of Example IIIA except for the additional of the styrene at the completion of the metering.

The curves of FIGS. 1–4 give no indication of the degree or type of branching, but merely illustrate the percent of styrene entering the copolymer at any percent of conversion of total monomer.

In the batch process illustrated in FIG. 1, the copolymer initially is formed of mostly butadiene and very little styrene. As the butadiene is consumed and the concentration of styrene increases, the percent of styrene being copolymerized gradually increases. Then when the butadiene is entirely polymerized, the percent of styrene rises sharply to 100 percent to form terminal block polystyrene. This copolymer has very little styrene randomly copolymerized in the polymer backbone and therefore high running temperature.

In the copolymerization illustrated in FIG. 2, the copolymer initially is formed of mostly butadiene until with a slow rate of monomer feed a concentration of styrene is accumulated to the point where the copolymer being formed corresponds to the ratio in the monomer feed. When all of the monomer blend has been fed in and the butadiene is thereafter consumed, the styrene monomer rises to 100 percent and gives terminal block polystyrene.

The contour of the curve in FIG. 3 starts out as in FIG. 2. However, when the final one-third of the monomer blend is dumped into the reactor, the curve drops sharply while the added butadiene is being polymerized. Then when the butadiene has been consumed, the styrene monomer content increases to 100 percent and terminal block polystyrene is produced.

In FIG. 4 monomer blend is all metered in so there is no abrupt addition of butadiene that causes the sharp drop in the curve of FIG. 3, and when the 5 percent styrene is added at the end of the metering this, in addition to the accumulated styrene monomer causes a sharp rise in the curve and produces more terminal block polystyrene than in FIG. 3.

The polymers of this invention differ from prior art polymers in the high degree of branching, the random copolymer structure in the polymer backbone, and the increased number of blocks of polystyrene distributed at the terminals of the various branches of the copolymer. These differences are evidenced by improvement in green strength, low running temperature and good processability.

A "block" of repeating units is defined as a sequence or series of eight or more identical repeating units connected to each other. Analyses for block polystyrene may be made by oxidation with osmium tetraoxide according to the procedure published in Jour. Polymer Sci., Vol. 1, No. 5, P. 429 (1946).

"Green" strength is the strength of the uncured composition, that is of the formulation which is to be placed in a mold for curing. In determining the green strength values reported herein, a commercially available Instron device is used with each sample having dimensions of 0.5 inch × 3 inches × 0.100 inch, an initial jaw separation of 1 inch, a crosshead speed of 50 inches per minute, a chart speed of 20 inches per minute and a full scale chart range of 10 lbs.

In the green strengths tests various values are determined including the percent elongation under the force applied in stretching the sample at constant speed, the percent elongation at peak green strength, the peak green strength, the green strength at "break" and the percent elongation at break, and the energy required to produce the break. The value most indicative of improved green strength is that for the energy required to produce the break. This is calculated by plotting a curve with the values for stress (psi) plotted versus percent elongation up to the point of break. The area under this curve gives the energy value in pounds per square inch.

In preparing the sample for the green strength test, the formulation is mixed in a Banbury mixer and then sheeted on a mill to approximately the desired thickness. The sheets are cut to a 6 inch × 6 inch square to fit a compression mold of those dimensions. Each sheet is compression molded for 5 minutes at 212° F. to an exact thickness of 0.1 inch. Then the molded sheet is cut into strips of 0.5 × 3 × 0.1 inch.

In preparing the samples for green strength and running temperature, the test results will vary somewhat according to the particular formulation or composition used in preparing the test samples. Therefore, for true comparative tests the test samples for comparing polymers should have identical formulations. However, regardless of the formulation used, the polymers of this invention have improved green strength and good running temperatures when compared in an identical formulation with prior art polymers. A typical formulation is that used in Examples VI and VII. With this formulation the energy required for break with polymers of this invention is at least 300 psi.

The samples used in the running temperature tests are prepared by curing the composition in a mold 1.5 inches high having a rectangular base 2.1 inches × 1.1 inches and a rectangular top, centered above the base 2.0 inches × 1.0 inch. The details of the "Firestone Flexometer" test used for the running temperature determinations are described in ASTM D623-67, Method B. The sample is flexed repeatedly in this test under a load of 250 lbs. with a 0.3 inch throw. The temperature of the sample after 75 minutes of flexing is reported as the running temperature. The copolymers of this invention have a running temperature of no more than 295° F., preferably no more than 250° F.

The viscosities reported herein and used for molecular weight determinations are dilute solution viscosity (DSV). The dilute solution viscosity is defined as the inherent viscosity determined at 25° C. on a 0.4 percent solution of the polymer in toluene. It is calculated by dividing the natural logarithm of the relative viscosity by the percent concentration of the solution, i.e., it is the inherent viscosity measured at 0.4 percent concentration. The invention is illustrated by the following examples. These examples are given merely for purposes of illustration and are not intended in any way to restrict the scope of the invention nor the manner in which it can be practiced. Unless specified otherwise, parts and percentages are given by weight.

EXAMPLE I

Into a 50-gallon reactor equipped with an agitator, a means for maintaining a dry nitrogen atmosphere and a jacketing means for controlling the temperature, there is placed 210 lbs. of a blend of hexane, styrene and butadiene. The hexane represents 85.7 percent and the monomer mixture 14.3 percent, with the styrene-butadiene ratio being 20/80 by weight. The temperature is raised to 150° F. and 0.0166 lbs. of n-BuLi representing 0.006 parts of Li per 100 parts of monomer is added. The stirring is continued and the temperature is raised to 230° F. as quickly as possible and maintained at that temperature for 2 hours. Then the reaction mass is cooled to approximately room temperature and the batch dropped into methanol containing an antioxidant. Various analyses are made on the polymer product with the following results:

| | |
|---|---|
| Total solids | 14.0 |
| DSV | 1.4 |
| Peak Green Strength (lb.) | 6.5 |
| Peak at EL (%) | 10 |
| Running Temp. (°F.) | 318 |

This shows the relatively poor peak strength obtained by the ordinary technique of copolymerizing butadiene and styrene by batch operation.

EXAMPLE II

Into the reactor used in Example I which is also equipped with a means for feeding in monomer blend, there is placed 120 lbs. of hexane which has been treated with n-BuLi in an amount to counteract the amount of impurities determined by a standard titration method. Then the temperature is raised to 240° F. (115° C.) and n-BuLi catalyst charge is added, after which the monomer blend is metered into the reactor at a constant rate that would require 1.5 hours to feed the entire amount. However, at the end of one hour when two-thirds (60 lbs. of monomer blend) has been fed in, the remaining one-third (30 lbs. of monomer blend) is dumped into the reactor and the reaction continued for an additional hour at 240° F. At this time the reaction mass is cooled to room temperature and dropped into methanol containing antioxidant. The proportions, conditions and results are tabulated below.

| | |
|---|---|
| Monomer blend: Monomer/hexane | 33/67 |
| Styrene/Butadiene Ratio | 20/80 |
| Catalyst Level | 0.006 |
| Metering Time (Hrs.) | 1.0* |
| Polymerization Temp. °F. | 240 |
| Total Solids | 14.0 |
| DSV | 2.2 |
| % Block Styrene | 5 |
| Peak Green Strength (lbs.) | 9.2 |
| Peak at EL (%) | 375 |
| Running Temperature °F. | 275 |

*Remaining ⅓ dumped in.

This example demonstrates the improvement in green strength as compared to the batch operation of Example I, namely 9.2 lbs. vs. 6.5 lbs. for peak green strength and 375% vs. 10% for peak strength upon elongation. Together with this improvement the running temperature has decreased from 318° F. to only 275° F.

EXAMPLE III

The procedure of Example II is repeated using cyclohexane as the diluent, with the proportions, conditions and results tabulated below. Runs A and B are identical except that in B when there is only one-third of the monomer mix remaining, this one-third is dumped into the reactor and in each case the reaction is continued for one hour after all the monomer has been added.

|  | A | B |
| --- | --- | --- |
| Diluent | Cyclohexane | Cyclohexane |
| Styrene/Butadiene Ratio | 43/57 | 43/57 |
| Catalyst Level (Parts C-Li per 100 pts. mon.) | 0.006 | 0.006 |
| Metering Time (Hrs.) | 1.25 | 1.1* |
| Polymerization Temp. (°F.) | 250 | 250 |
| Total Solids | 14.0 | 14.0 |
| DSV | 2.95 | 3.65 |
| % Block Styrene | 1.4 | 11.0 |
| Peak Green Strength (lbs.) | 10.1 | 22.0 |
| Peak at EL (%) | 425 | 675 |
| Running Temp. °F. | 250 | 260 |

*Remainder dumped into reactor when all but ⅓ of the monomer mix has been metered in.

This also demonstrates the improvements effected by dumping in the remaining one-third of monomer mix and also shows that cyclohexane is a more favorable diluent.

EXAMPLE IV

The procedure of Example III is repeated using a mixture of 70 parts hexane and 30 parts cyclohexane instead of cyclohexane, a temperature of 240° F. instead of 250° F. and a slower metering time. The improvement in green strength effected by dumping the remainder of monomer mix into the reactor when only one-third remains is even more pronounced under these conditions rising from 6.2 in C to 26.0 in D.

|  | C | D |
| --- | --- | --- |
| Diluent | 70 Hexane 30 Cyclohexane | 70 Hexane 30 Cyclohexane |
| Styrene/Butadiene Ratio | 30/70 | 30/70 |
| Catalyst Level | 0.006 | 0.006 |
| Metering Time (Hrs.) | 3.0 | 2.1* |
| Polymerization Temp. (°F.) | 240 | 240 |
| Total Solids | 14.8 | 14.8 |
| DSV | 2.55 | 4.64 |
| % Block Styrene | 0 | 10.2 |
| Peak Green Strength | 6.2 | 26.0 |
| Peak at EL (%) | 0 | 775 |
| Running Temp. °F. | 260 | 270 |

*Remainder dumped in when all but ⅓ of monomer mix metered in.

EXAMPLE V

The procedure of Example II is repeated a number of times using variations in the rate of metering in all of the monomer blend so as to determine the degree of conversion to polymer by the end of the metering period for a variety of metering rates. In each case 75 lbs. of hexane is introduced to the reactor and 75 lbs. of monomer blend is metered in, using a blend of 67 percent hexane and 33 percent monomer with the monomer consisting of 30 percent styrene and 70 percent butadiene. The catalyst proportion is sufficient to give 0.006 parts Li per 100 parts of monomer and the polymerization is conducted at 230° F. (110° C.) In each case the blend is all metered in, then a sample is removed for testing and polymerization of the remainder is completed by continuing for another hour, after which the reaction mass is processed as in Example II and analyzed with the results given in the table immediately below.

| Metering Time (Min.) | % Polymer | % Monomer | At end of metering, parts of styrene per 100 parts of initial monomer | | Block Polystyrene in final polymer |
| --- | --- | --- | --- | --- | --- |
|  |  |  | In Copolymer | In Unpolymerized Monomer |  |
| 75* | 95 | 5 | 27.7 | 2.3 | 2.6 |
| 60* | 94 | 6 | 26.7 | 3.3 | 3.2 |
| 45* | 92 | 8 | 24.5 | 6.5 | 4.2 |
| 25 | 85 | 15 | 17.9 | 12.1 | 7.5 |
| 10 | 75 | 25 | 11.5 | 18.5 | 12.4 |
| 5** | 62 | 38 | 5.6 | 24.4 | 15.7 |

*Metering rate too slow to accumulate styrene monomer for terminal block polystyrene - Would be satisfactory rate if more styrene monomer added after or towards end of metering.
**Metering rate too fast to give sufficient random styrene copolymerization.

EXAMPLE VI

The procedure of Example II is repeated a number of times using a number of variations. In each case 75 lbs. of hexane is introduced to the 50-gallon reactor and 75 lbs. of monomer blend is metered in, using a blend of 67 percent hexane and 33 percent monomer with the monomer consisting of 30 percent styrene and 70 percent butadiene. The catalyst proportion is again sufficient to give 0.006 parts Li per 100 parts of monomer. The variations in conditions and results are given in the table immediately below. In each case the blend is metered in, except that in Exp. F the final one-third is dumped in, and the reaction continued for one hour hereafter. From the high percentages of block polystyrene in Exps. A and B, it is apparent that the polymerization rate at the lower temperature of 120° and 170° F. (49° C. and 77° C.) are not fast enough even at the slower metering rate to consume all of the butadiene and thereby promote random copolymerization of the styrene. Therefore, the styrene accumulates until all of the butadiene has been introduced and polymerized. In contrast, the higher temperature of Exps. C and D even with a faster metering time causes a faster polymerization of the butadiene so that as the system is starved for butadiene, the styrene is copolymerized and used to form random copolymer and when the feeding of blend is completed, there is little styrene left to form block polystyrene. In Exp. E, with the same polymerization temperature as in C and D, the faster metering rate, while it still allows some random copolymerization, results in enough styrene accumulated by the completion of the feeding that 8.3 percent block styrene is formed with an increase in green strength. In Exp. F, where a slower feeding is used than in Exp. E but the last one-third of the feed is dumped in, the block polystyrene is increased to 8.6 percent with a considerable increase in green strength.

The formulations used for the green strength and running temperature tests in this example and in Examples VII and VIII have the composition:

```
50  parts carbon black
 3  parts zinc oxide
 2  parts stearic acid
 5  parts Piccopale 100 (commmercial aliphatic
    hydrocarbon resin)
10  parts naphthenic processing oil (MPO)
1.7 parts sulfur
1.2 parts N-t-butyl-2-benzozothiazolesulfenamide
100 parts of copolymer (Cyclex B accelerator)
```

| Exp. No. | Polymerization Temp. °F. | Metering Time Min. | DSV | % Block Styrene | Green Strength Energy (psi) for break | Running Temp. °F. | Williams Plasticity 1-Min. Reading | Recovery |
|---|---|---|---|---|---|---|---|---|
| A | 120 | 120 | 1.8 | 22.2 | 192 | 250 | 9.64 | 1.71 |
| B | 170 | 120 | 1.9 | 13.2 | 312 | 231 | 8.96 | 1.44 |
| C | 230 | 75 | 2.1 | 2.2 | 224 | 208 | 8.62 | 2.28 |
| D | 230 | 75 | 2.5 | 1.9 | 278 | 186 | 9.05 | 2.20 |
| *E | 230 | 25 | 1.5 | 8.3 | 412 | 230 | 9.10 | 1.90 |
| *F | 230 | 50** | 1.7 | 8.6 | 750 | 213 | 9.38 | 1.54 |

*Within the scope of invention conditions.
**Blend metered in until ⅔ fed in and then the remaining ⅓ dumped in and reaction continued 1 hour.

EXAMPLE VII

The procedure of Example VI is repeated a number of times using in place of the hexane a mixture of 25 lbs. toluene and 50 lbs. of hexane. The conditions and results are shown in the table immediately below. With this particular solvent combination there is 0 percent block polystyrene at the metering rate of Exps. G and H indicating that the styrene has all been used in random copolymerization. In Exp. I where the final one-third of the feed is dumped in, the block polystyrene rises to 5.6 percent with accompanying increase in green strength as indicated by the high value for the energy for break. Exp. I also shows very good running temperature and processability (good Williams Plasticity).

so that catalyst may be continuously introduced. The outlet from this reactor is connected to a similar second reactor of 40-gallon capacity which is provided with a styrene monomer inlet near the inlet where the product from the first reactor is introduced into the second reactor. The second reactor is provided with an outlet remote from the feed inlets and an agitator which provides much less agitation than provided in the first reactor. The reactors are swept clean of air with a nitrogen stream and then a stream of monomer blend and a stream of catalyst are fed into the first reactor. When the first reactor is filled the reaction mass is allowed to flow into the second reactor while a stream of styrene is fed continuously into the second reactor. When the second reactor is filled, the reaction mass therein is flowed continuously into methanol containing antioxidant and the product processed as in the earlier examples. The monomer blend fed to the first reactor consists of 125 parts of hexane, 17.5 parts of butadiene and 7.5 parts of styrene (giving a 70–30 ratio of butadiene to styrene). The feed rate is adjusted to give a residence time of 75 minutes in the first reactor and 1 hour in the second reactor. The catalyst feed rate is adjusted to give 0.006 part Li (as N-BuLi) per 100 parts of monomer, and the styrene feed rate is adjusted to add 10 parts of styrene per 100 parts of initial monomer. The product has average values of 9.4 percent block polystyrene, green strength energy for break of 740 psi, and a running temperature of 220° F. (105° C.) when tested in the formulation described above for Example VI.

| Exp. No. | Polymerization Temp.°F. | Metering Time Min. | DSV | % Block Styrene | Green Strength Energy (psi) for break | Running Temp. °F. | Williams Plasticity 1-Min. Reading | Recovery |
|---|---|---|---|---|---|---|---|---|
| G | 230 | 75 | 1.9 | 0 | 108 | 207 | 5.76 | 0.84 |
| H | 230 | 50*⁻² | 1.1 | 0 | 50 | 242 | 3.07 | 0.13 |
| *I | 230 | 50*⁻³ | 1.5 | 5.6 | 340 | 235 | 7.04 | 2.21 |

*⁻²Samples taken after ⅔ of the blend is metered in.
*⁻³I is a continuation of H with the remaining ⅓ of the blend dumped in and reaction continued for one hour.

EXAMPLE VIII

The reactor used in Example VI is modified to provide an outlet remote from the point where the monomer blend is introduced and another inlet is provided While certain features of this invention have been described in detail with respect to the various embodiments thereof, it will, of course, be apparent that other modifications may be made within the spirit and scope of this invention, and it is not intended to limit the invention to the exact details shown above except insofar as they are defined in the following claims.

The invention claimed is:

1. A process for preparing butadiene styrene copolymers of improved green strength and low running temperature comprising the steps (a) of polymerizing a mixture of 40–85 percent by weight of butadiene and 15–60 percent by weight of styrene in a hydrocarbon solvent, while the said mixture is fed into the polymerization system containing a lithium-hydrocarbon initiator, at a rate slow enough to effect random copolymerization of at least 10 percent styrene in the resulting polymer backbone, effecting said copolymerization at a temperature in the range of 90°–175° C. to produce a high degree of branching in said copolymer, and (b) effecting the final 10–50 percent of the polymerization with a monomer portion containing a higher proportion of styrene than is incorporated into the polymer backbone, and effecting the formation of block homopolystyrene at the terminals of the branches in said polymer by maintaining 50–100 percent styrene in the monomer portion during the conversion of the final ten percent of monomer to polymer.

2. The process of claim 1 in which said lithium hydrocarbon initiator is an n-alkyl lithium.

3. The process of claim 2 in which said initiator is n-butyllithium.

4. The process of claim 1 in which the slow rate of monomer feed is such that at least 60 percent of total monomer would be converted to polymer during the period required to feed in all the monomer at that rate.

5. The process of claim 1 in which the final 50–20 percent of said monomer mixture is fed all at once into said polymerization system.

6. The process of claim 1 in which the final 35–20 percent of said monomer mixture is fed all at once into said polymerization system.

7. The process of claim 1 in which the condition of having 50–100 percent styrene in the final 10 percent conversion to polymer is effected by adding styrene monomer over and above the amount in said comonomer feed directly to the polymerization system during or immediately after the final 50 percent conversion.

8. The process of claim 7 in which said styrene monomer addition is made during or immediately after the final 10 percent conversion.

9. The process of claim 4 in which the polymerization is conducted continuously with the monomer feed being introduced at one point in the system with efficient agitation being effected to give immediate homogeneity to the polymerization mixture and withdrawing polymer solution from the system at a point remote from the point of monomer feed, the residence time between said two points being at least 15 minutes.

10. The process of claim 9 in which said residence time is at least 30 minutes.

11. The process of claim 9 in which said residence time is not substantially more than the time required for 100 percent conversion to polymer.

12. The process of claim 1 in which the polymerization is conducted continuously with an initial monomer feed being introduced at one point in the system with efficient agitation being effected to give immediate homogeneity to the polymerization mixture, a second monomer feed being introduced at a point remote from said point of initial monomer feed, where at least 50 percent of the initial monomer feed has been converted to polymer and withdrawing polymer solution from the system at a point remote from said second monomer feed point and still further remote from said initial monomer feed point, the residence time between said second feed point and the polymer solution exit point being at least 10 percent of the total residence time, and the total residence time being at least 15 minutes.

13. The process of claim 12 in which said total residence time is at least 30 minutes.

14. The process of claim 12 in which the amount of said monomer feed introduced at said second feed point comprises 50–20 percent of the total monomer feed.

15. The process of claim 12 in which the monomer feed introduced at said second feed point is more concentrated with styrene than in said initial monomer feed.

16. The process of claim 15 in which said second monomer feed is 50–100 percent styrene.

17. The process of claim 1 in which said hydrocarbon solvent is an aliphatic, aromatic or cycloaliphatic hydrocarbon of 4–8 carbon atoms.

18. The process of claim 17 in which said solvent is hexane.

19. The process of claim 17 in which said solvent is cyclohexane.

20. The process of claim 1 in which said hydrocarbon solvent is present in a proportion of 200  900 parts by weight per 100 parts of monomer.

21. The process of claim 1 in which said lithium hydrocarbon initiator is present in a proportion of 0.001–1 millimole per mole of monomer.

* * * * *